United States Patent
Kementsietsidis et al.

(10) Patent No.: US 9,531,749 B2
(45) Date of Patent: Dec. 27, 2016

(54) PREVENTION OF QUERY OVERLOADING IN A SERVER APPLICATION

(71) Applicant: International Business Machines Corporation, Armonk, NY (US)

(72) Inventors: Anastasios Kementsietsidis, Mountain View, CA (US); Spyros Kotoulas, Dublin (IE); Marco L. Sbodio, Dublin (IE); Pierpaolo Tommasi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 14/454,170

(22) Filed: Aug. 7, 2014

(65) Prior Publication Data

US 2016/0044038 A1    Feb. 11, 2016

(51) Int. Cl.
| | |
|---|---|
| *H04L 29/06* | (2006.01) |
| *H04L 12/911* | (2013.01) |
| *H04L 12/801* | (2013.01) |
| *H04L 29/08* | (2006.01) |
| *H04L 12/863* | (2013.01) |
| *G06F 9/50* | (2006.01) |
| *G06F 17/30* | (2006.01) |
| *H04L 12/803* | (2013.01) |

(52) U.S. Cl.
CPC ......... *H04L 63/1458* (2013.01); *G06F 9/5083* (2013.01); *G06F 17/30516* (2013.01); *H04L 47/11* (2013.01); *H04L 47/125* (2013.01); *H04L 47/627* (2013.01); *H04L 47/821* (2013.01); *H04L 63/0807* (2013.01); *H04L 67/1002* (2013.01); *H04L 67/1008* (2013.01)

(58) Field of Classification Search
CPC .... H04L 47/821; H04L 47/11; H04L 67/1002; H04L 47/627; H04L 47/125; H04L 67/1008; G06F 9/5083; G06F 17/30516
See application file for complete search history.

(56) References Cited

U.S. PATENT DOCUMENTS

| | | | |
|---|---|---|---|
| 7,849,069 B2 | 12/2010 | Liu et al. | |
| 7,860,883 B2 | 12/2010 | Hinton et al. | |
| 8,443,002 B2 | 5/2013 | Chandrasekar et al. | |

(Continued)

FOREIGN PATENT DOCUMENTS

| | | |
|---|---|---|
| EP | 2270622 A2 | 1/2011 |
| WO | 2009064114 A2 | 5/2009 |

*Primary Examiner* — Mohammad A Siddiqi
(74) *Attorney, Agent, or Firm* — Reza Sarbakhsh (57) ABSTRACT

A system for processing a transaction request. A transaction request is received by a server computer that includes a user identification and an associated request token, to execute on an application on the server computer. It is determined by the server computer whether available resources on the server computer to perform the transaction are below respective threshold values. In response to determining, by the server computer, that the available resources on the server computer to perform the transaction are below the threshold value, the server computer determines whether the user identification is allowed access to the application. In response to determining that the user identification is allowed access to the application, the transaction is executed on the server computer. In response to determining that the user identification is not allowed access to the application, the transaction is rejected.

17 Claims, 6 Drawing Sheets

(56) References Cited

U.S. PATENT DOCUMENTS

| | | | |
|---|---|---|---|
| 8,595,810 B1* | 11/2013 | Ben Ayed | H04L 63/0815 |
| | | | 713/168 |
| 2004/0049777 A1* | 3/2004 | Sullivan | G06Q 20/123 |
| | | | 725/5 |
| 2007/0118891 A1* | 5/2007 | Buer | G06F 21/34 |
| | | | 726/8 |
| 2011/0173684 A1* | 7/2011 | Hurry | G06F 21/33 |
| | | | 726/6 |
| 2011/0173697 A1 | 7/2011 | Kurapati et al. | |
| 2012/0031969 A1* | 2/2012 | Hammad | G06F 21/34 |
| | | | 235/380 |
| 2013/0007856 A1* | 1/2013 | Bennett | G06F 21/33 |
| | | | 726/6 |
| 2013/0103785 A1 | 4/2013 | Lyon | |
| 2014/0019752 A1* | 1/2014 | Yin | H04L 63/0435 |
| | | | 713/155 |
| 2014/0351911 A1* | 11/2014 | Yang | H04L 63/0838 |
| | | | 726/7 |
| 2014/0365659 A1* | 12/2014 | Schmidt | H04L 47/821 |
| | | | 709/226 |
| 2015/0142673 A1* | 5/2015 | Nelsen | G06Q 20/405 |
| | | | 705/76 |

\* cited by examiner

PREVENTION OF QUERY OVERLOADING IN A SERVER APPLICATION

BACKGROUND OF THE INVENTION

The present invention relates generally to the field of information security, and more particularly to overload protection through access control and authentication using tokens.

Query processing in a distributed system requires the transmission of data between databases, or repositories, in a network. Multiple repositories, or federated repositories, enable the use of multiple repositories simultaneously. Information can be obtained via a query of the federated system. The message traffic caused by queries utilize computer resources and may cause an overload if there is a large volume of such messages. A concern is also the purposeful overload of a system, for example, a Denial-of-Service (DoS) or Distributed DoS (DDoS) attack.

In a DoS attack, an attacker bombards a victim network or server with a large volume of message traffic. Handling this traffic consumes the victim's available bandwidth, CPU capacity, or other system resources, and eventually brings the victim to a condition in which it is unable to serve its legitimate clients. A DDoS attacks can be even more damaging, as they involve creating overwhelming additional network traffic from multiple sources simultaneously. This may be called a zombie, or botnet, attack. A DDoS attack may occur when an attacker attempts to control a large number of devices on a network by using malicious programs that self-replicate across the network by exploiting security flaws in widely-used services. This malicious program, or "worm," uses other computing devices to participate in a DDoS attack. This may occur with a background process such that a device user may not be aware that the device is participating in an attack. The attacker may have no direct connection with the victim as it will use the zombies to overwhelm the victim with requests. An increase in activity alone may not a good criterion for detecting a DDoS because the requests may be legitimate. Filtering by source is difficult as the attacker may use false or "spoofed" source IP addresses so that the address may not give a true indication of the source of the attack.

SUMMARY

Embodiments of the present invention disclose a method, computer program product, and system for processing a transaction request. A transaction request is received by a server computer that includes a user identification, to execute on an application on the server computer. It is determined by the server computer whether available resources on the server computer to perform the transaction are below respective threshold values. In response to determining, by the server computer, that the available resources on the server computer to perform the transaction are below the threshold value, the server computer determines whether the user identification is allowed access to the application. In response to determining that the user identification is allowed access to the application, the transaction is executed on the server computer. In response to determining that the user identification is not allowed access to the application, the transaction is rejected.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may make a determination whether an incoming transaction request, such as a request for service to a server application, is authenticated. The request is authenticated by the server through an exchange of information with the client, which does not consume significant processing power of the server application. This may validate the requestor and allow the request to pass to the server application. If the verification fails or the requestor does not respond to the verification exchange of information, the request will be rejected.

Figure 1:
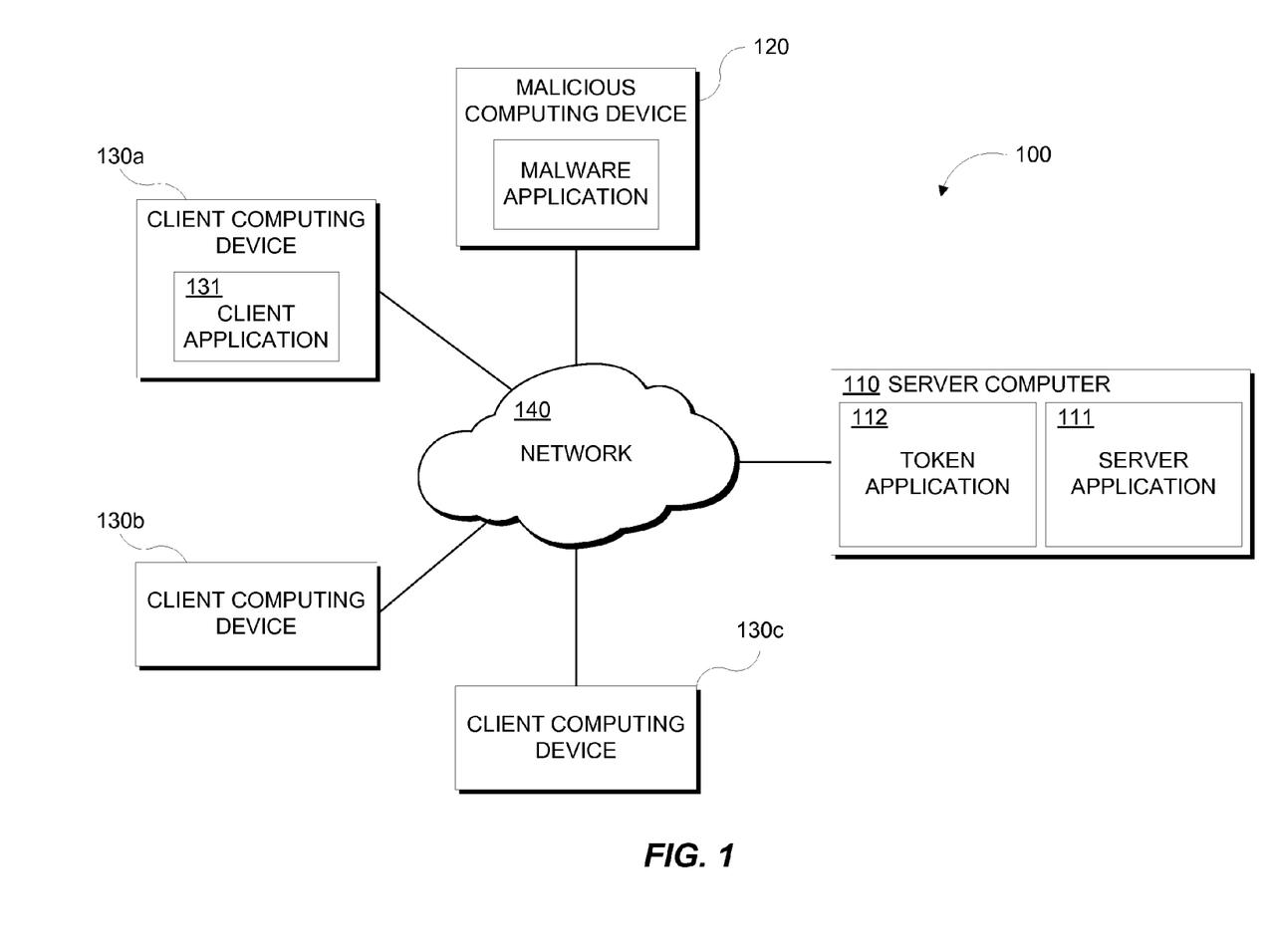
FIG. 1 is a functional block diagram illustrating a distributed data processing environment, in accordance with an embodiment of the present invention.

FIG. 1 is a functional block diagram illustrating a distributed data processing environment 100, in accordance with an embodiment of the present invention. Data processing environment 100 includes server computer 110, malicious computing device 120, and client computing devices 130a, 130b, 130c, all interconnected over network 140.

Network 140 may include permanent connections, such as wire or fiber optic cables, or temporary connections made through telephone or wireless communications. Network 140 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 140 may also include a number of different types of networks, such as, for example, an intranet, a local area network (LAN), or a wide area network (WAN).

Each of server computer 110, malicious computing device 120, and client computing devices 130 may be a laptop computer, tablet computer, netbook computer, personal computer (PC), a desktop computer, a smart phone, or any programmable electronic device capable of an exchange of data packets with other electronic devices, for example, through a network adapter, in accordance with an embodiment of the invention, and which may be described generally with respect to FIG. 6 below.

Malicious computing device 120 represents a source of an overload on server computer 110, for example, a DDoS attack on server computer 110. Malicious device 120, for example, may represent one or more computing devices that execute an application that sends continuous service requests to server computer 110 for the purpose of participating in a DDoS attack on server computer 110. As described above, for example, computing devices 130 may or may not be aware of, or intentionally participating in, the DDoS attack.

Server computer 110 includes server application 111 and token application 112, which are described in more detail below with reference to FIG. 2. In various embodiments of the invention, server computer 110 operates generally to host a server application, for example, server application 111, that may receive service requests and send data in response to processing the service requests. The service requests may be a query using various protocols, for example, Simple Protocol and RDF Query Language (SPARQL), that may retrieve and manipulate data in a format, for example, Resource Description Framework format. Illustrative examples of the use of the SPARQL query protocol include, but are not limited to, IBM's Tivoli, Rational, DB2, or Intelligence Operations Center (IOC) database product lines. Server application 111 may be, for example, database oriented, computation oriented, or a combination of these. Server application 111 may receive a service request for data or a computation, and may send the requested data or results of the computation if server application 111 completes the service request. In various embodiments of the invention, a token application 112, which may be separate from the server application, authenticates incoming service requests based on a "token" scheme. Token application 112 distributes a controlled number of request tokens, as described in more detail below, to authenticated requestors. Incoming service requests may include these tokens. Under certain conditions, for example, when the number of incoming service requests threaten to overload the request queue in server application 111, only service requests that include an authenticated token may be passed to the queue. In exemplary embodiments, token application 112 may be optimized such that the resources required to authenticate incoming service requests are very low. In this manner, if resource utilization of server computer 110 or the server application becomes an issue, for example during a DDoS attack or when a legitimate number of incoming service requests threatens to overwhelm server application 111, the number of incoming service requests that are passed to the server application may be controlled by token application 112.

Figure 2:
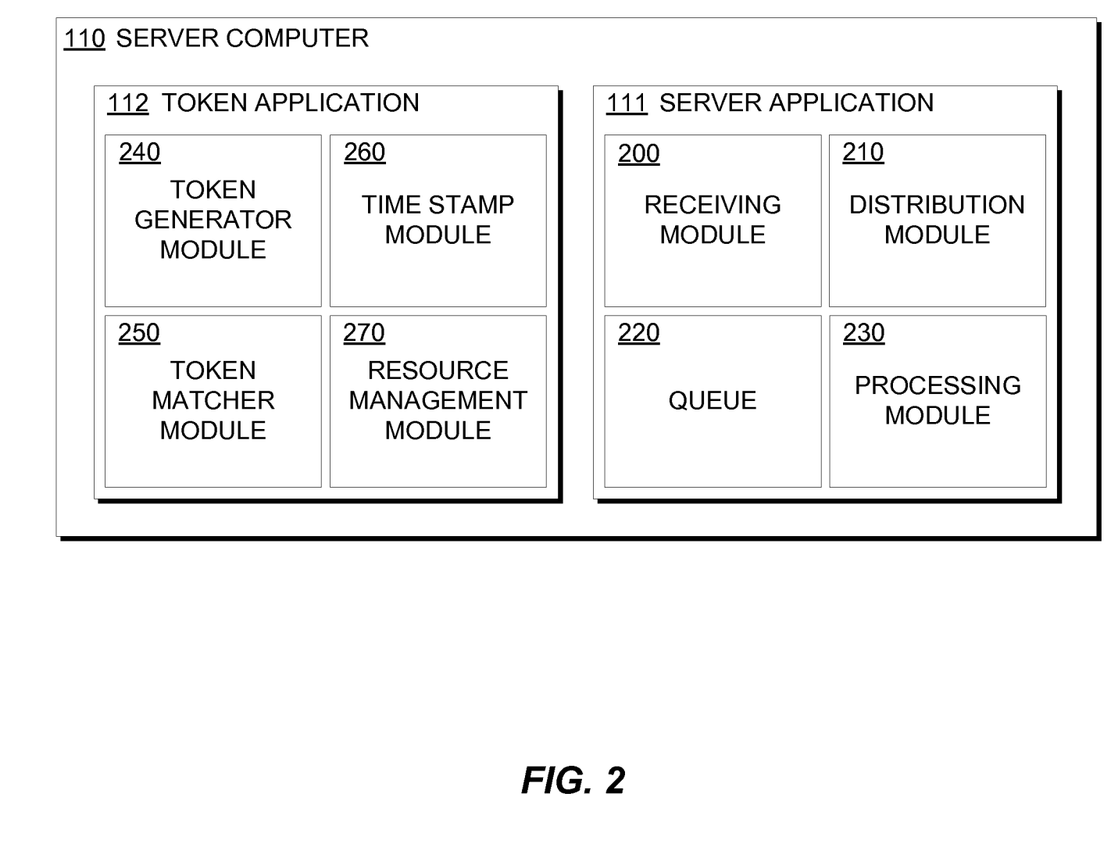
FIG. 2 is a functional block diagram illustrating the components of server applications, in accordance with an embodiment of the present invention.

FIG. 2 is a functional block diagram illustrating the components of server application 111 and token application 112, in accordance with an embodiment of the present invention. Server application 111 is an application that may receive service requests and may process those requests, in accordance with an embodiment of the present invention. Server application 111 includes receiving module 200, distribution module 210, queue 220, and processing module 230.

Figure 6:
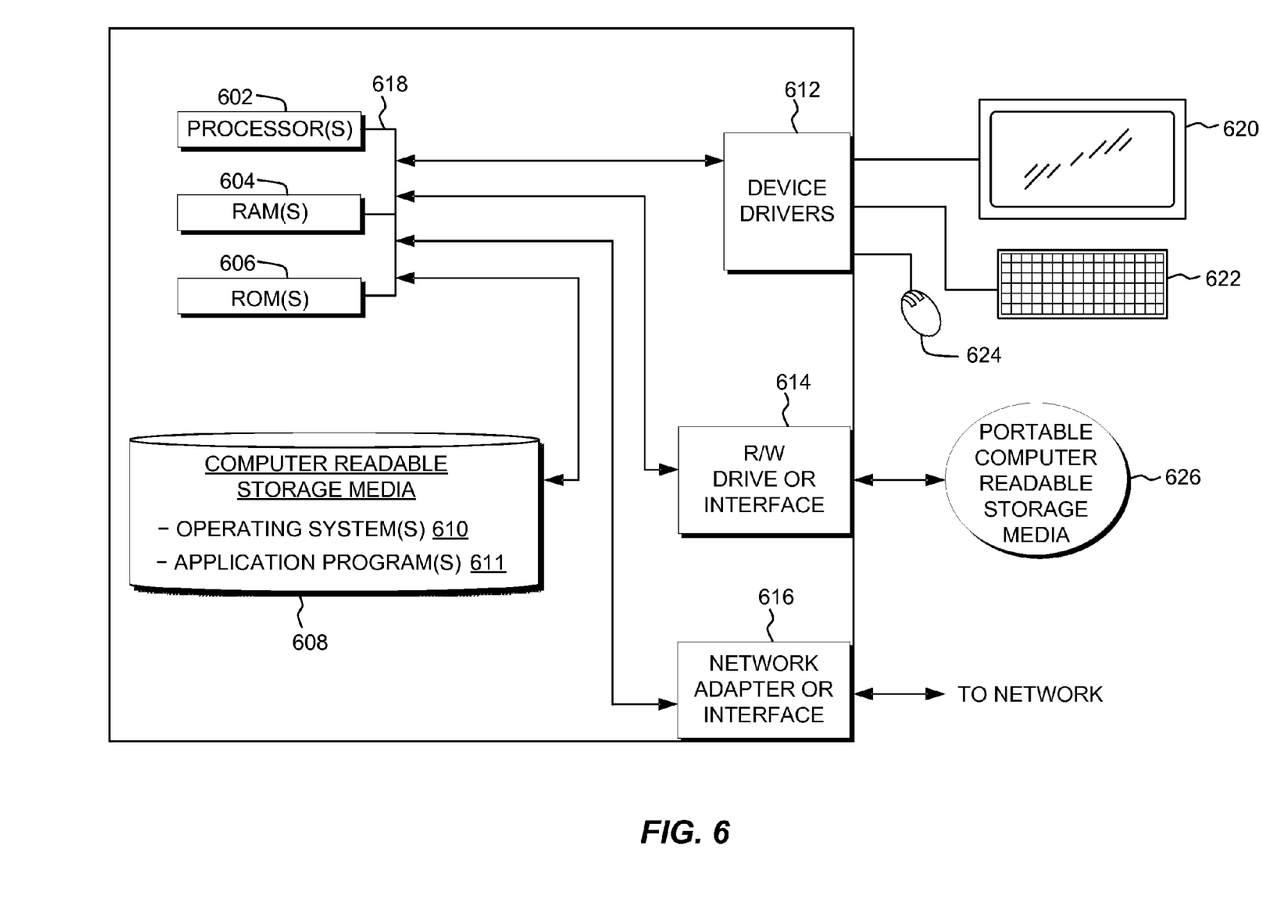
FIG. 6 depicts a block diagram of components of a computing device, in accordance with an embodiment of the present invention.

Receiving module 200 may receive a service request from a computing device for data or a computation that may be performed by processing module 230, via, for example, token application 112, and network 140 via, for example, network adapter or interface 616 (FIG. 6). Receiving module 200 may, for example, perform one or more service request verification functions to determine that the request information is in the correct format, etc.

When receiving module 200 receives the service request, the request is stored into entries of queue 220. Queue 220 may be, for example, a FIFO queue, a circular queue, or any other data structure, in accordance with an embodiment of the invention.

Processing module 230 may read service requests from entries of queue 220. In an exemplary embodiment, queue 220 is a FIFO queue, and processing module 230 reads and processes the oldest service requests from the entries at the bottom of queue 220. In an exemplary embodiment, receiving module 200 may be adding service requests to entries at the top of queue 220 while processing module 230 is reading and processing requests from entries at the bottom of the queue.

Distribution module 210 may receive the processing results from processing module 230 and may transmit those results, for example, to the requestor via network 140, in accordance with an embodiment of the present invention. In certain embodiments, distribution module 210 may include a distribution queue for queuing processing results received from processing module 230 for transmission to the requestor.

In a typical server application, if the server is overwhelmed by incoming service requests, for example, as the result of an overload, for example, a DDoS attack or a high volume of legitimate requests, the server may attempt to over-allocate memory resources to the request or distribution queues, which may cause the server application to crash. In addition, if the server application must spend resources receiving each service request, there may not be enough resources devoted to processing the requests. In this situation, the server may not crash, however, the service request response time may increase to an unacceptable level.

In various embodiments of the invention, token application 112 may control the flow of incoming service requests being received by server application 111. Token application 112 may control the flow of requests by intercepting service requests before the requests are received by server application 111, in accordance with an embodiment of the present invention. In an exemplary embodiment, token application 112 may intercept service requests when the token application determines that the resources available to server application 111 are below an acceptable threshold. Resource threshold values may be established for, as an example, percentage of CPU processing utilization, RAM consumption, traffic over network 140, bandwidth usage, or other resource limitations in the hardware or software of server computer 110 that may be monitored by token application 112. If resources fall below threshold, token application 112 may only accept service requests with tokens. Token application 112 may authenticate incoming tokens to determine the validly of those tokens. If token application 112 receives a service request with a token and that token is authenticated, the request will be passed to server application 111. Otherwise, the service request may be rejected, in accordance with an embodiment of the present invention.

Token application 112 includes token generator module 240, token matcher module 250, time stamp module 260, and resource management module 270.

In an exemplary embodiment of the invention, a user may subscribe to server application 111. Token generator module 240 may receive a request from, for example, a client computing device 130, to subscribe to server application 111 so that the client computing device 130 may receive one or more request tokens. Subscribing may prevent service requests transmitted by a client computing device 130 from being rejected when server application 111 has resources below threshold. This subscription request may be received by token generator module 240. If token generator module 240 receives a subscription request, token generator module 240 may send the client computing device 130 a "subscription message" indicating that token generator 240 requires, for example, a user ID to identify the source of subscription request, to authenticate the user as legitimate, or make a payment, in order to subscribe. Identification requirements may be, for example, the user entering a CAPTCHA, providing and confirming an email address, social media access information, user ID name and password, financial information for subscribing by payment, or any combination or method of verification in accordance with an embodiment of the invention.

If token generator module 240 receives proper identification information, token generator module 240 may subscribe the user by storing the received identification information to a data store, for example, in a list of subscribed or "trusted" users and unique user names, on disk and/or in memory. This list may be stored in a data store, for example, a data store in RAM(S) 604 (FIG. 6). Additional information may be stored on a client computing device 130, for example, as part of a two-part or asymmetric key arrangement for request token or user authentication, as described in more detail below.

When a user is successfully subscribed and known as a trusted user, token generator module 240 may generate and send the user "request tokens." A request token may be, for example, data packet containing a number, list of numbers, certificate file, random data, key files based on private or public key cryptography, or any predetermined information in a data packet associated with each request token that can be generated, stored, sent, and received by token generator module 240.

In an embodiment of the invention, a request token may also include information, for example, pertaining to priority, in which the subscriber may pay more during the subscription process for priority request tokens. Service requests received with priority request tokens may be processed before service request received with request tokens, as described below.

The information in a request token may be unique for each request token to prevent, for example, request tokens copied by malicious computing device 120 from being used or accepted. Token generator module 240 may generate and store request tokens in a data store or "token data store." When a user is successfully subscribed, token generator module 240 may pull tokens from the data store, for example, in a FIFO or LIFO stack method, implemented through an array or linked list. Token generator module 240 may send request tokens, for example, attached information when replying to an HTTP request, for example, a POST or GET request, a cookie, key file, flat file enclosed in the message body, or data concealed via steganography.

Figure 3:
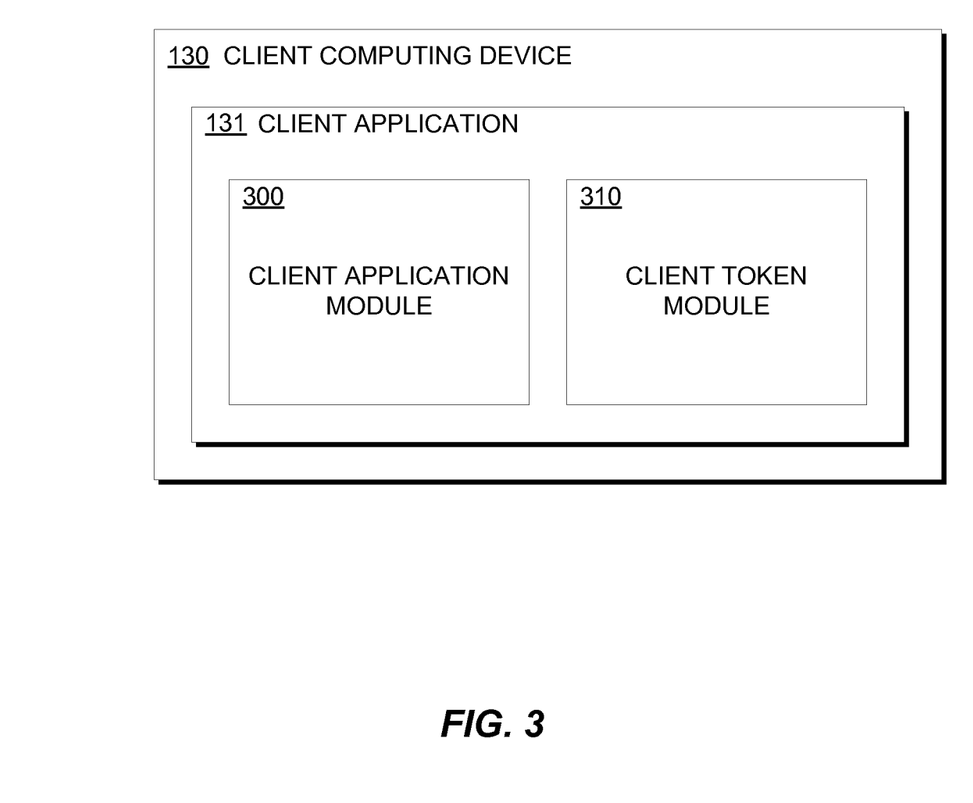
FIG. 3 is a functional black diagram illustrating the components of a client application, in accordance with an embodiment of the present invention.

Each client application 131, described in more detail below, may receive, store, and attach request token(s) to service requests, indicating a client application 131 is subscribed and trusted.

Figure 4:
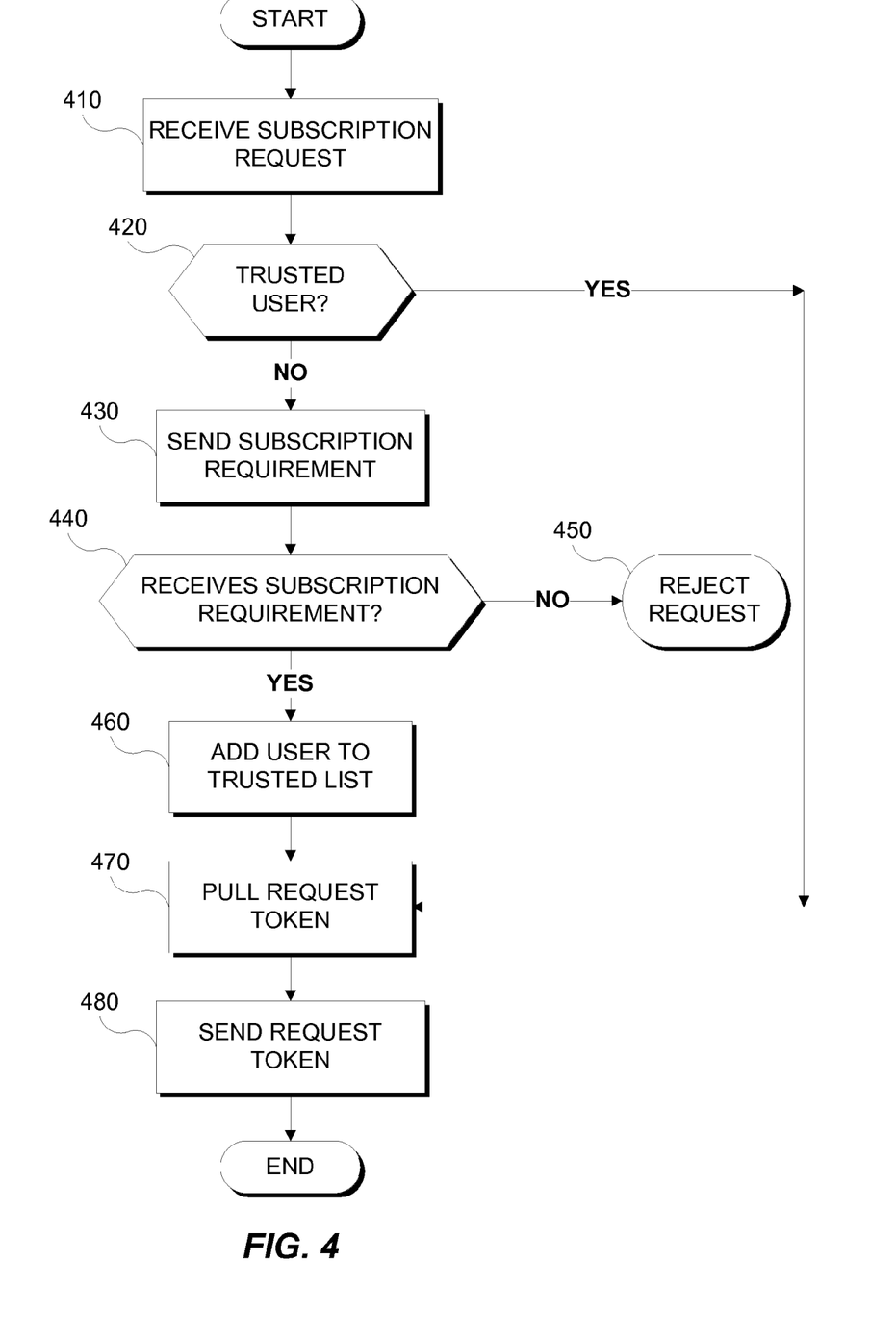
FIG. 4 is a flowchart depicting operational steps of a user subscribing to a program on a server computer, in accordance with an embodiment of the present invention.

FIG. 4 is a flowchart depicting operational steps of token generator module 240 for processing a subscription request, in accordance with an embodiment of the invention. Token generator module 240 receives a subscription request (step 410). Token generator module 240 determines if the request is coming from a trusted user by, for example, checking a list in a data store of trusted users or checking for a user ID or other identifying information was provided, for example header information, network provenance, operating system used, or the date and/or time of the request (step 420). If the user is not trusted, (decision step 420, "NO" branch) token generator module 240 sends a message to the user with the requirements needed to subscribe (step 430). The user provides identifying information in order to subscribe and become a trusted user (step 440). If token generator module 240 receives the required information (decision step 440, "YES" branch), the user may be considered trusted, and token generator module 240 adds the user to a list of trusted users (step 460) by creating an entry for that user in a data store containing a list of all trusted users. Token generator module 240 pulls a request token from the request token data store (step 470). Token generator module 240 sends request tokens, and may send additional data files used for token or user authentication, to the trusted user (step 480). If token generator module 240 does not receive the required information (decision step 440, "NO" branch), for example, the information is incorrect or no information is provided, token generator module rejects the request (step 450). If token generator module 240 receives a subscription request (step 410) and the user is trusted (decision step 420 "YES" branch) token generator module 240 pulls a request token from the request token data store (step 470) and sends request tokens to the user (step 480).

Returning to FIG. 2, in an exemplary embodiment, token matcher module 250 may control the flow of incoming service requests being received by server application 111. Token matcher module 250 may control the flow of service requests by intercepting service requests before the service requests are received by server application 111. If incoming server requests have request tokens, token matcher module 250 may authenticate incoming tokens to determine the validly of those tokens. Token matcher module 250 may receive service requests coming into server computer 110 over network 140, instead of receiving module 200. When receiving a service request, token matcher module 250 may query resource management module 270, described in more detail below, to determine if sufficient resources are available to process the service request. If resource management module 270 responds to the query indicating that there are sufficient resources available to process the service request, token matcher module 250 passes the service request directly to receiving module 200 for processing by processing module 230.

If resource management module 270 responds to the query indicating that there are not sufficient resources available to process the service request, token matcher module 250 may first determine if the service request has an attached or embedded request token. Token matcher module 250 may communicate with a client application 131, described in more detail below, and may determine if the received service request from a client application 131 has a request token. If the service request does not include a request token, token matcher module 250 may send a message to each client application 131 that may indicate, for example, that the service request should be sent with a request token, each client application 131 should subscribe to server application 111 to receive request tokens, or the service request cannot be processed and will be rejected.

If resource management module 270 responds to the query indicating that there are not sufficient resources available to process the service request and the service request includes a request token, token matcher module 250 may determine if the request token is authentic. In an exemplary embodiment of the present invention, in order to authenticate tokens, token matcher module 250 may include a data store of request tokens generated by token generator module 240. The data store of request tokens in token matcher module 250 may contain a list that may include, for example, request tokens that have been sent by token generator 240 to trusted users and the corresponding unique user ID's that the request tokens were sent to. When a request token is received by token matcher module 250, the token matcher module 250 may authenticate the request token by matching, for example, the incoming data packet containing a number, list of numbers, key, certificate file, any unique information data packet, or additional information attached to the request representing the request token, against the list of request token identifying characteristics in the data store. Authentication may also be based on the encryption and the decryption of a password with asymmetric keys.

In an exemplary embodiment, token matcher module 250 may, after successful authentication, "consume" the token by, for example, removing the token identification characteristic from the token lists of token generator module 240.

In this manner, if token matcher module 250 receives the same token that has been previously used, the token will not be recognized, in accordance with an embodiment of the present invention.

Figure 5:
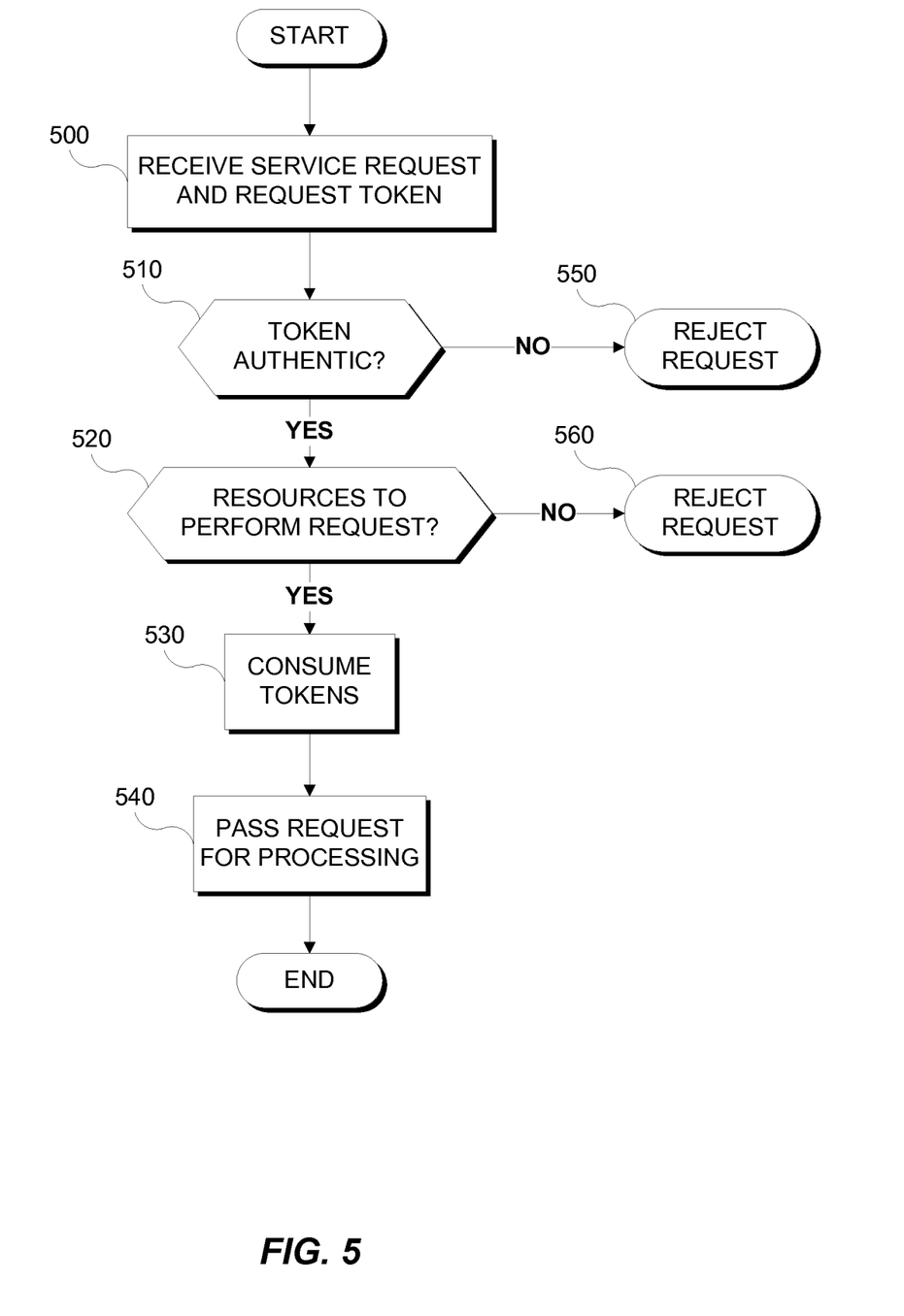
FIG. 5 is a flowchart depicting operational steps of a request and authentication process, in accordance with an embodiment of the present invention.

FIG. 5 is a flowchart depicting operational steps of token matcher module 250, in accordance with an embodiment of the invention. Token matcher module 250 receives a service request along with a request token (step 500). Token matcher module 250 determines if the token is authentic (decision step 510) by comparing the received request token's identifying characteristics with the corresponding identifying characteristics from a list in memory that may contain, for example, request tokens that have been sent by token generator 240 to trusted users and the corresponding unique user ID's to which the request tokens were sent. If the characteristics match, the token is authenticated (decision step 510, "YES" branch). If the token is not authenticated (decision step 510, "NO" branch) token generator module 240 rejects the request (step 550). When token matcher module 250 indicates that the request token is authenticated, token matcher module 250 queries resource management module 270 to determine if there are sufficient resources to perform the service request (decision step 520). If matcher module 250 receives a response from resource management module 270 indicating that the computer resources are sufficient to perform the service request, (decision step 520, "YES" branch), the token matcher module 250 consumes the token by removing that token from the list of usable tokens (step 530) and the token matcher module 250 passes the request to receiving module 200 to be processed (step 540). If there are insufficient computer resources to perform the service request (decision step 520, "NO" branch) token matcher module 250 rejects the request (step 560).

Returning to FIG. 2, in certain embodiments, time stamp module 260 may include a valid period of use within request tokens that are generated by token generator module 240. The valid period of use, or timestamp, may have an associated start time, and end time, or "expiration." When request tokens are received by token matcher module 250, token matcher module 250 may authenticate the request token as well as determine if the request token was received within the valid period of the time stamp. A request token received by token matcher module 250 that is not within the valid period of use may be considered expired and token matcher module 250 may consider the token not successfully authenticated, and may reject the request token and/or service request.

In an alternative embodiment, all request tokens may be not sent to the subscribed client device but stored in a data store in token generator module 240. If a client computing device 130 subscribes, token generator module 240 may create a request token data store associated with that subscribed user or "token account." When a client computing device 130, or requestor, sends a service request to token matcher module 250, token matcher module 250 may query token generator module 240 to determine if there is a token account for the requestor. If there is a token account, token generator module 240 may pass a request token from the token account to token matcher module 250. Token matcher module 250 may receive, authenticate and consume the request token as described above. If there is no token account or the token account for that requestor is empty, token matcher module 250 may send a message to the requestor indicating that the requestor must subscribe or the request may be rejected.

In an exemplary embodiment, resource management module 270 may monitor the available computer resources of the modules in server application 111, and of server 110 against predetermined threshold values. If queried, for example, by token matcher module 250, resource management module 270 will respond, for example, by indicating if any available computer resources are below their associated threshold values. As described above, if one or more available computer resources drops below their associated predetermined threshold values, token matcher module 250 may begin authenticating service requests before passing the requests to server application 111.

In an exemplary embodiment, resource management module 270 may monitor one or more of the following: the number of service requests received by receiving module 200, the rate service requests are stacking in queue 220 from receiving module 200, the rate processing module 230 can take service requests from queue 220, the rate that service requests are stacking in queue 220, the rate that distribution module 210 is stacking data from processing module 230, the rate distribution module 210 is sending results, the free memory available to server application 111, the bandwidth usage due to incoming service requests and/or outgoing data results from server computer 110. High average bandwidth use, or instant spikes in bandwidth use, may be caused by, for example, legitimate traffic or a DDoS attack from malicious computing device 120 over network 140, or other applications on server 110 consuming incoming or outgoing bandwidth of server 110. The above examples are merely possible resources that may be periodically monitored by resource management module 270 and other resource thresholds may be created depending on the embodiment of the invention.

Client computing devices 130 may include client applications 131. In various embodiments of the invention, client applications 131 may operate to send service requests, may receive, store, and send request tokens, or send and receive data, which the client applications 131 may use in further processing.

FIG. 3 is a functional black diagram illustrating the components of a client application 131 in a computing devices 130, in accordance with an embodiment of the invention. A client application 131 may be an application that may communicate with server computer 110 through, for example, a web browser. A client application 131 may subscribe to server application 111 and may allow a user to input information in order to send to server application 111 to be authenticated. A client application 131 may also send or receive service requests, service request results, or data packets or request tokens. A client application 131 includes application module 300 and client token module 310.

Client application module 300 may be an application for receiving input from a user, displaying data in a GUI, or communicating over a network, for example, a web browser. Client application module 300 may be able to access server computer 110 over network 140. Client application module 300 may receive subscription messages, initiate subscription requests and have a data store for subscription information. Client application module 300 may send a request to subscribe to token generator module 240. Client application module 300 may receive a "subscription message" from token generator 240 indicating that token generator 240 requires, for example, a user ID to identify the source of subscription request, to authenticate client application module 300 as legitimate in order to subscribe. Client application module 300 may send the proper identification information and token generator module 240 may subscribe the client application module 300 by storing the received identification information. Client application module 300 may receive a message that token generator module 240 added an ID for client application module 300 in a data store in memory, indicating that client application module 300 is successfully subscribed. If client application module 300 is successfully subscribed, client application module 300 may receive request tokens from token generator module 240. Client application module 300 may pass the request token to client token module 310.

Client Token module 310 may send service requests, send or receive request tokens, and store request tokens in a data store. Client token module 310 may receive request tokens passed from client application module 300. Client token module 310 may store request tokens in a request token data store. In an exemplary embodiment of the invention, client token module 310 may send a service request to token matcher module 250. If client token module 310 receives a message from token matcher module 250 that there are insufficient resources to perform the request, client token module 310 may resubmit the service request and add a request token. Client token module 310 may receive data or computation results from the service request and may, for example, send a new service request, store the data in a data store in memory, or pass the results to client application module 300 to be displayed.

If client token module 310 receives a message that the sent service request cannot be processed and client token module 310 does not have any request tokens in the request token data store, client token module 310 may pass a message to client application module 300 indicating that client application module 300 may send a subscription request in order to receive more request tokens.

In an alternative embodiment service requests may come from, for example, client computing devices 130, where, for example, client computing device 130a may communicate a service request to client computing device 130b and client computing device 130c. Client device 130b and client computing device 130c may calculate part of the query and may send those calculations or "intermediate results" along with the server request from client computing device 130a to server computer 110. If server computer 110 does not have sufficient resources, as described above, client computing devices 130b and 130c may have to subscribe to server computer 110, receive tokens, and send tokens along with the intermediate results and service request received from client computing device 130a. If client computing devices 130b and 130c receive results from server computer 110 client computing devices 130b and 130c may communicate the results to client computing device 130a.

FIG. 6 depicts a block diagram of components of server computer 110, malicious computing device 120, or client computing devices 130, of distributed data processing environment 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Server computer 110, malicious computing device 120, or client computing devices 130, may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, server application 111, token application 112, or client applications 131, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server computer 110, malicious computing device 120, or client computing devices 130, may also include a R/W drive or interface 614 to read from and write to one or more portable computer readable storage media 626. Application programs 611 on server computer 110, malicious computing device 120, or client computing devices 130 may be stored on one or more of the portable computer readable storage media 626, read via the respective R/W drive or interface 614 and loaded into the respective computer readable storage media 608.

Server computer 110, malicious computing device 120, or client computing devices 130 may also include a network adapter or interface 616, such as a TCP/IP adapter card or wireless communication adapter (such as a 4G wireless communication adapter using OFDMA technology). Application programs 611 on server computer 110, malicious computing device 120, or client computing devices 130 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Server computer 110, malicious computing device 120, or client computing devices 130 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for mitigating a distributed denial of service attack, the method comprising:
    receiving, by a computer, a transaction request, wherein the transaction request includes a user identification to execute by an application on the computer;
    generating a token;
    communicating the generated token to a client computer;
    receiving, by the computer, from the client computer, a computation request, wherein the computation request includes at least the generated token;
    determining, by the computer, whether the received token is authentic;
    determining, by the computer, whether available resources to perform the transaction are below a resource threshold value;
    in response to determining that the available resources to perform the transaction are below the threshold value, determining, by the computer, whether the user identification is allowed access to the application based on the available resources and whether the received token was received within a valid period of a time stamp;
    executing, by the computer, the transaction based on the user identification; and
    in response to determining that the received token is not authentic, rejecting the transaction.

2. A method in accordance with claim 1, wherein determining whether the token is authentic further comprises:
    associating, by the server computer, the token with the user identification;
    recording, by the server computer, the association of the token with the user identification;
    transmitting, by the server computer, the token to the client computer;
    determining, by the server computer, whether the received token matches the recorded token, and the received user identification matches the recorded user identification;
    in response to determining that the received token matches the recorded token, and the received user identification matches the recorded user identification, executing the transaction on the server computer; and
    in response to determining that one or both of: the received token does not match the recorded token, or the received user identification does not match the recorded user identification, rejecting the transaction.

3. A method in accordance with claim 1, wherein the available resources include one or more of: CPU resources, memory available to the server computer application, available entries in queues associated with the server application, instant and average available bandwidth on a network connected to the server computer.

4. A method in accordance with claim 1, wherein a threshold value includes one or more of: percentage of processing utilization on the server computer, percentage of memory utilization, a predetermined level of bandwidth use over the network connected to the server computer.

5. A method in accordance with claim 1, wherein the token includes one or more of: a data packet containing a number, a list of numbers, a certificate file, random data, key files based on private or public key cryptography, a timestamp.

6. A method in accordance with claim 2, wherein creating, associating, recording, and transmitting are performed in response to receiving, by the server computer, a subscription request from the client computer to execute transactions on the application on the server computer.

7. A computer program product for mitigating a distributed denial of service attack, the computer program product comprising:
    one or more computer-readable storage media and program instructions stored on the one or more non-transient computer-readable storage media, the program instructions comprising:
    program instructions to receive from a client computer, by a server computer, a transaction request, wherein the transaction request includes a user identification, to execute by an application on the server computer;
    program instructions to generate a token;
    program instructions to communicate the generated token to a client computer;
    program instructions to receive, by the server computer, from the client computer, a computation request, wherein the computation request includes at least the generated token;
    program instructions to determine, by the server computer, whether the received token is authentic;
    program instructions to determine, by the server computer, whether available resources on the server computer to perform the transaction are below respective threshold values;
    program instructions to determine, by the server computer, whether the user identification is allowed access to the application and whether the token was received within a valid period of a time stamp, wherein the program instructions to determine are executed in response to determining, by the server computer, that the available resources on the server computer to perform the transaction are below the threshold value;
    program instructions to execute the transaction on the server computer, in response to determining that the user identification is allowed access to the application; and
    program instructions to reject the transaction, in response to determining that the user identification is not allowed access to the application.

8. A computer program product in accordance with claim 7, wherein program instructions to determining whether the token is authentic further comprises:
    program instructions to associate, by the server computer, the token with the user identification;
    program instructions to record, by the server computer, the association of the token with the user identification;

program instructions to transmit, by the server computer, the token to the client computer;

program instructions to determine, by the server computer, whether the received token matches the recorded token, and the received user identification matches the recorded user identification;

program instructions to execute the transaction on the server computer, in response to determining that the received token matches the recorded token, and the received user identification matches the recorded user identification; and program instructions to reject the transaction, in response to determining that one or both of: the received token does not match the recorded token, or the received user identification does not match the recorded user identification.

9. A computer program product in accordance with claim 7, wherein the available resources include one or more of: CPU resources, memory available to the server computer application, available entries in queues associated with the server application, instant and average available bandwidth on a network connected to the server computer.

10. A computer program product in accordance with claim 7, wherein a threshold value includes one or more of: percentage of processing utilization on the server computer, percentage of memory utilization, a predetermined level of bandwidth use over the network connected to the server computer.

11. A computer program product in accordance with claim 7, wherein the token includes one or more of: a data packet containing a number, a list of numbers, a certificate file, random data, key files based on private or public key cryptography, a timestamp.

12. A computer program product in accordance with claim 8, wherein program instructions to create, associate, record, and transmit are performed in response to receiving, by the server computer, a subscription request from the client computer to execute transactions on the application on the server computer.

13. A computer system for mitigating a distributed denial of service attack, the computer system comprising:
a computer processor;
a non-transient computer-readable storage media;
program instructions stored on the computer-readable storage media for execution a processor, the program instructions comprising:
receiving a transaction request, wherein the transaction request includes a user identification, to execute by an application on the server computer;
program instructions to generate a token;
program instructions to communicate the generated token to a client computer;
program instructions to receive, by the server computer, from the client computer, a computation request, the computation request includes at least the generated token;
program instructions to determine, by the server computer, whether the received token is authentic;

program instructions to determine, by the server computer, whether available resources on the server computer to perform the transaction are below respective threshold values;

program instructions to determine, by the server computer, in response to determining, that program instructions to determine, by the server computer, whether the user identification is allowed access to the application and whether the token was received within a valid period of a time stamp, wherein the program instructions to determine are executed in response to determining, by the server computer, that the available resources on the server computer to perform the transaction are below the threshold value;

program instructions, in response to determining that the user identification is allowed access to the application, to execute the transaction on the server computer; and program instructions to reject the transaction, in response to determining that the user identification is not allowed access to the application.

14. A computer system in accordance with claim 13, wherein program instructions to determining whether the token is authentic further comprises:
program instructions to associate, by the server computer, the token with the user identification;
program instructions to record, by the server computer, the association of the token with the user identification;
program instructions to transmit, by the server computer, the token to the client computer;
program instructions to determine, by the server computer, whether the received token matches the recorded token, and the received user identification matches the recorded user identification;
program instructions to execute the transaction on the server computer, in response to determining that the received token matches the recorded token, and the received user identification matches the recorded user identification;
program instructions to reject the transaction, in response to determining that one or both of: the received token does not match the recorded token, or the received user identification does not match the recorded user identification.

15. A computer system in accordance with claim 13, wherein the available resources include one or more of: CPU resources, memory available to the server computer application, available entries in queues associated with the server application, instant and average available bandwidth on a network connected to the server computer.

16. A computer system in accordance with claim 13, wherein a threshold value includes one or more of: percentage of processing utilization on the server computer, percentage of memory utilization, a predetermined level of bandwidth use over the network connected to the server computer.

17. A computer system in accordance with claim 13, wherein the token includes one or more of: a data packet containing a number, a list of numbers, a certificate file, random data, key files based on private or public key cryptography, a timestamp.

* * * * *